(12) United States Patent
Nanayakkara et al.

(10) Patent No.: US 8,749,086 B2
(45) Date of Patent: Jun. 10, 2014

(54) DEEP WATER HYDRO-ELECTRIC POWER SYSTEM

(71) Applicants: Lakdas Nanayakkara, Boca Raton, FL (US); Pravin Nanayakkara, Boca Raton, FL (US)

(72) Inventors: Lakdas Nanayakkara, Boca Raton, FL (US); Pravin Nanayakkara, Boca Raton, FL (US)

( * ) Notice: Subject to any disclaimer, the term of this patent is extended or adjusted under 35 U.S.C. 154(b) by 0 days.

(21) Appl. No.: 13/749,460

(22) Filed: Jan. 24, 2013

(65) Prior Publication Data

US 2013/0187386 A1 Jul. 25, 2013

Related U.S. Application Data

(60) Provisional application No. 61/589,999, filed on Jan. 24, 2012.

(51) Int. Cl.
*F03B 13/00* (2006.01)
*H02K 7/18* (2006.01)
*F03B 17/00* (2006.01)

(52) U.S. Cl.
CPC ........... *H02K 7/1823* (2013.01); *F05B 2240/97* (2013.01); *Y10S 415/916* (2013.01); *Y02E 10/20* (2013.01); *F03B 17/005* (2013.01); *F03B 17/00* (2013.01)
USPC ................................. 290/54; 290/52; 415/916

(58) Field of Classification Search
CPC .......... F03B 13/00; F03B 13/08; F03B 13/10; F03B 17/06; F03B 17/063; F01D 15/10; Y02E 10/22; Y02E 10/28
USPC .................................................. 290/43, 52, 54
See application file for complete search history.

(56) References Cited

U.S. PATENT DOCUMENTS

| 1,438,812 | A | * | 12/1922 | Damiano | 405/77 |
| 5,297,925 | A | * | 3/1994 | Lee et al. | 415/7 |
| 7,915,750 | B1 | * | 3/2011 | Rovinsky | 290/54 |
| 8,164,209 | B2 | * | 4/2012 | Rovinsky | 290/54 |

FOREIGN PATENT DOCUMENTS

WO WO2011005215 A1 * 1/2011

* cited by examiner

*Primary Examiner* — Tho D Ta
(74) *Attorney, Agent, or Firm* — Melvin K. Silverman

(57) ABSTRACT

A deep-water power generation system includes an initially evacuated sphere having walls of suitable strength or reinforcement for maintaining its structural integrity in deep-water pressures; a power axle extending from a north pole thereof to below a south pole of the sphere; blades of a turbine secured upon a support frame secured to the axle in a latitudinal plane of the sphere; and inlet ports positioned at the plane of the blades of the turbine and receiving an inflow of ambient deep water against the blade. The fluid flow induces rotation of the blades power axle secured to the frame. A thrust deck is rigidly secured, within the sphere, to the power axle and above the turbine and a generator is secured upon the thrust deck at the south pole of the sphere spirally expelling water from the south pole of the system.

20 Claims, 20 Drawing Sheets

DEEP WATER HYDRO-ELECTRIC POWER SYSTEM

CROSS REFERENCE TO RELATED APPLICATION

This application claims the benefit under 35 USC 119 (e) of the provisional patent application Ser. No. 61/589,999, filed Jan. 24, 2013, which is hereby incorporated by reference in its entirety.

BACKGROUND OF THE INVENTION

1. Area of Invention

The invention relates to a method of generating electrical power by extraction of potential energy in a deep water environment.

2. Prior Art

The desire to develop new methods of generating electricity has been a driving force throughout recent human history. At present, there are two main methods of generating electricity each with its own challenges: one uses fuel as the energy source and the other utilizes natural phenomena. Fuel-based energy generation has problems of cost of the fuel as well as the polluting byproducts of such fuel consumption. Exemplary fuels used as the energy source for power generation include coal, natural gas, nuclear fuel, and petro-chemicals. The challenges associated with using natural phenomena as an energy source vary with the technology used. For example, solar and wind forces do not produce energy in a predictable amount and the energy is often generated during off-peak consumer demand. Hydroelectric power provides a source of energy that can be harvested when needed, but the damming of bodies of water causes significant environmental harm. Nor is it readily responsive to power grid demand geometries. Other natural phenomena used to produce energy, for example, geothermal ocean waves, ocean thermal and buoyancy, are expensive to build and operate relative to the amount of energy they produce.

There are a few researchers who have utilized the potential energy from the gravitational force upon deep water to create pressure differentials between deep water and a low pressure vessel therein to produce useful work or energy.

Various efforts however have appeared in the past to attempt to harness the absolute pressure as well as associated potential energy associated with the extreme pressures which exist in deep water environments. Representative examples of these efforts appear in U.S. Pat. No. 3,163,985 (1965) to Bouyoucos, entitled Hydraulic Energy Storage System; U.S. Pat. No. 3,504,648 (1970) to Kriedt, entitled Deep Water Hydraulic Power Unit; U.S. Pat. No. 4,181,455 (1980) to Stanwick, entitled Apparatus For Generating Rotary Power in A Deep Sea Environment; U.S. Pat. No. 4,210,820 (1980) to Wittig, entitled Open Cycle System Structure; U.S. Pat. No. 6,666,024 (2003) to Moskal, entitled Method and Apparatus for Generating Energy Using Pressure From a Large Mass; and U.S. Pat. No. 7,188,471 (2007) to Walters, entitled Submersible Water Plant; and U.S. Pat. No. 7,911,073 (2011) to Smith, entitled Hydro-Hydraulic Gravitational Generator.

None of the above efforts have been commercially successful.

It is accordingly an object of the present invention to provide a deep water power generation system which responds to the long-felt need which, inter alia, is reflected is reflected in the deficiencies in the art cited above in achieving this objective.

SUMMARY OF THE INVENTION

A deep-water power generation system includes an initially evacuated enclosure having walls of suitable strength or reinforcement for maintaining the structural integrity thereof in deep-water pressures. Further includes is a power axle extending through said sphere from a north pole thereof to below a south pole of said enclosure. Within the sphere is a multiplicity of blades of a turbine secured upon a support frame secured to said axle in a latitudinal plane of said enclosure. Provided are a plurality of inlet ports within said sphere positioned at said latitudinal plane of said blades of said turbine and defining a direction of inflow of ambient deep water against said blades, in which energy from said fluid flow induces rotation of said blades, their said support frame and said power axle secured to said frame. The system also includes a thrust deck rigidly secured, within said enclosure, to said power axle and above said turbine and a generator secured upon said thrust deck, its axis of rotation defined by said power axle extending therethrough. A fluid power output of said sphere defined by a screw auger secured at a bottom end of said power axle proximally to said south pole of said enclosure, said screw auger spirally expelling water from said south pole as said power axle is caused to rotate by said ambient water inflow against said blades of said turbine.

It is an object of the invention to utilize potential energy in deep water, and other deep water environments, which exists at considerable pressure by providing a sphere capable of withstanding extreme pressures at a working depth.

It is another object to provide a durable and economical power system to extract power from the high absolute pressures which exist with the ocean and bodies of deep water from.

It is a further object to provide a power system which converts potential energy of ocean or fresh water at depth to kinetic energy and thus useable electric power.

It is a still further object of the invention to provide a prime mover for both general use and by submersibles.

It is a yet further object to provide a system which enables the provision of significantly greater quantities of total energy to be put to work and is practical for use of conventional and deep water hydraulic power systems.

The above and yet other objects and advantages of the present invention will become apparent from the hereinafter set forth Brief Description of the Drawings, Detailed Description of the Invention, and Claims appended herewith.

DETAILED DESCRIPTION OF THE INVENTION

Figure 1:
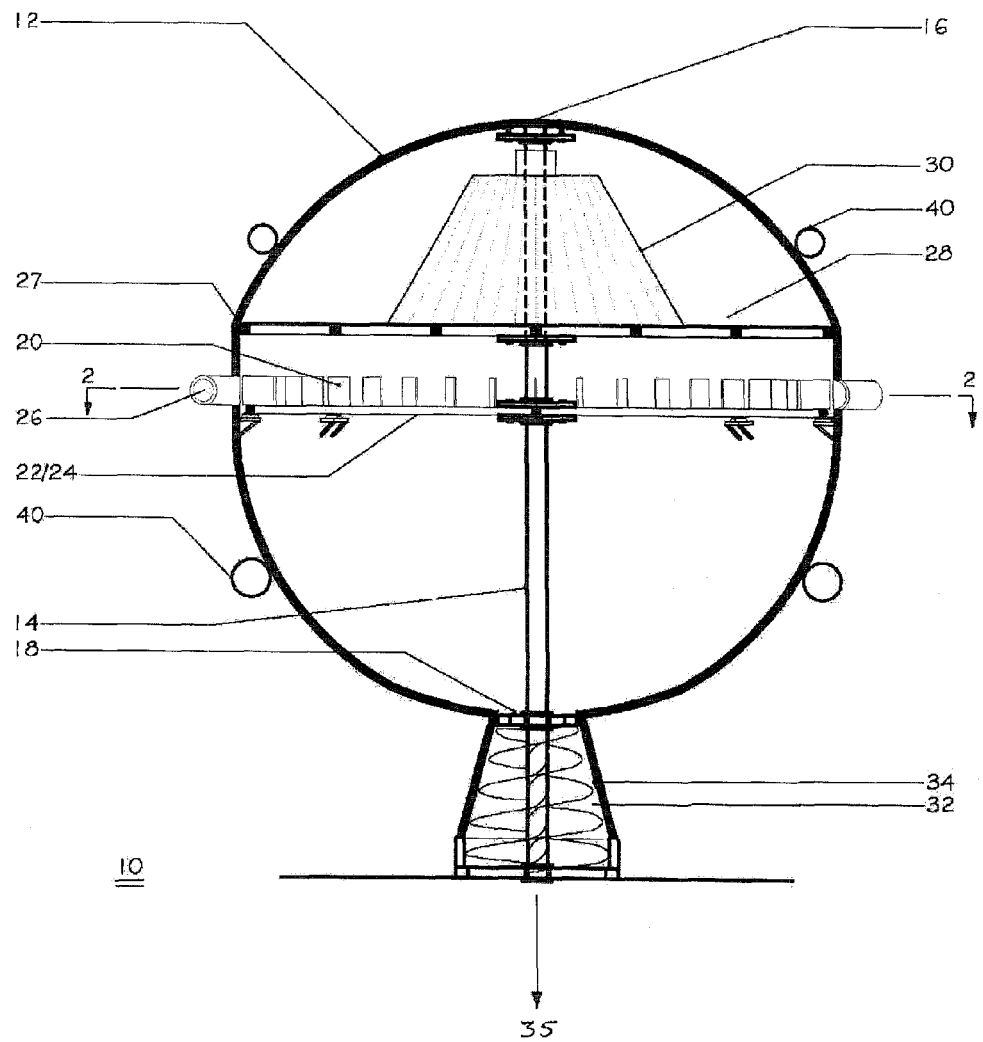
FIG. 1 is a vertical cross-sectional view of the inventive deep water power generation system.

With reference to the vertical cross-sectional view of FIG. 1, the instant deep-water power generation system 10 may be seen to include a sphere 12 which is initially evacuated of all air or water. The walls thereof are of suitable strength or reinforcement to maintain the structural integrity thereof at deep-water pressures as might be encountered at depths of deeper than 30 feet.

The invention is importantly characterized by a power axle 14 which extends through the entirety of the sphere from a north pole 16 thereof to below a south pole 18. These features may also be noted in FIGS. 3-6.

In the sphere are provided a multiplicity of blades 20 which are elements of a turbine 22, which is secured upon a support frame 24, which in turn is rigidly secured to said power axle 14 at a latitudinal plane of said sphere, for example, at a 15 degrees north latitudinal location. The turbine assembly may be more fully appreciated in the perspective views of FIGS. 3 and 4 in which the support frame 24 may also be seen. Therefrom it may be appreciated that support frame 24 consists of both radial and circumferential members.

Figure 2:
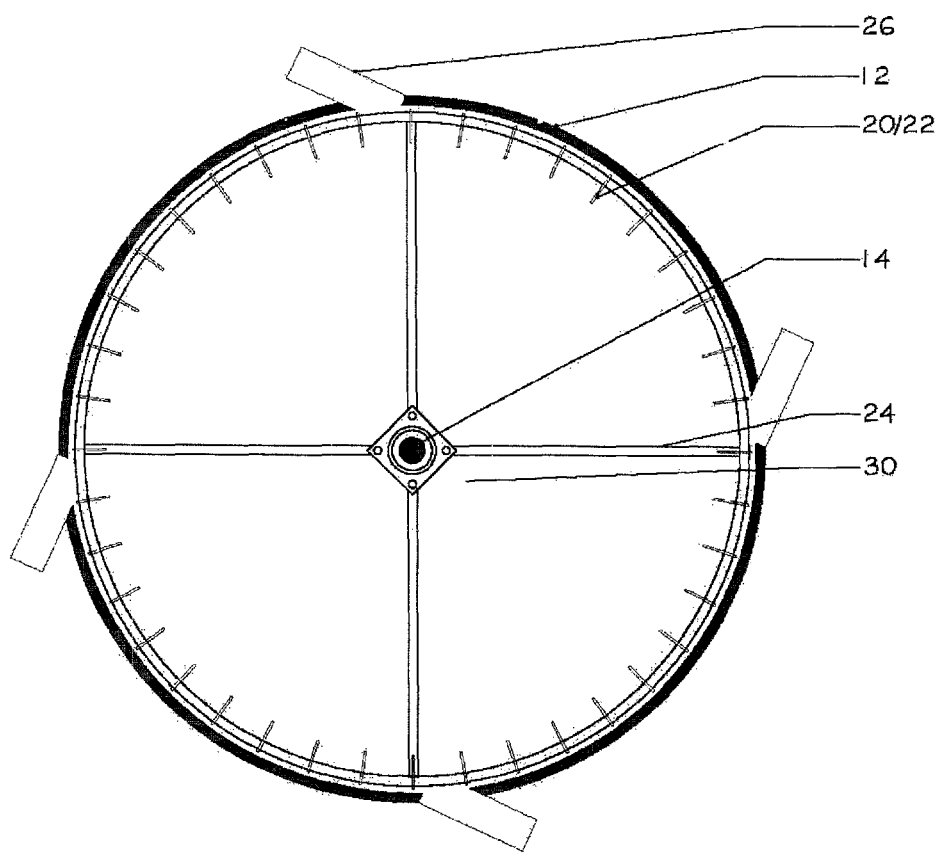
FIG. 2 is a horizontal cross-sectional view taken through Line 2-2 of FIG. 1
Figure 6:
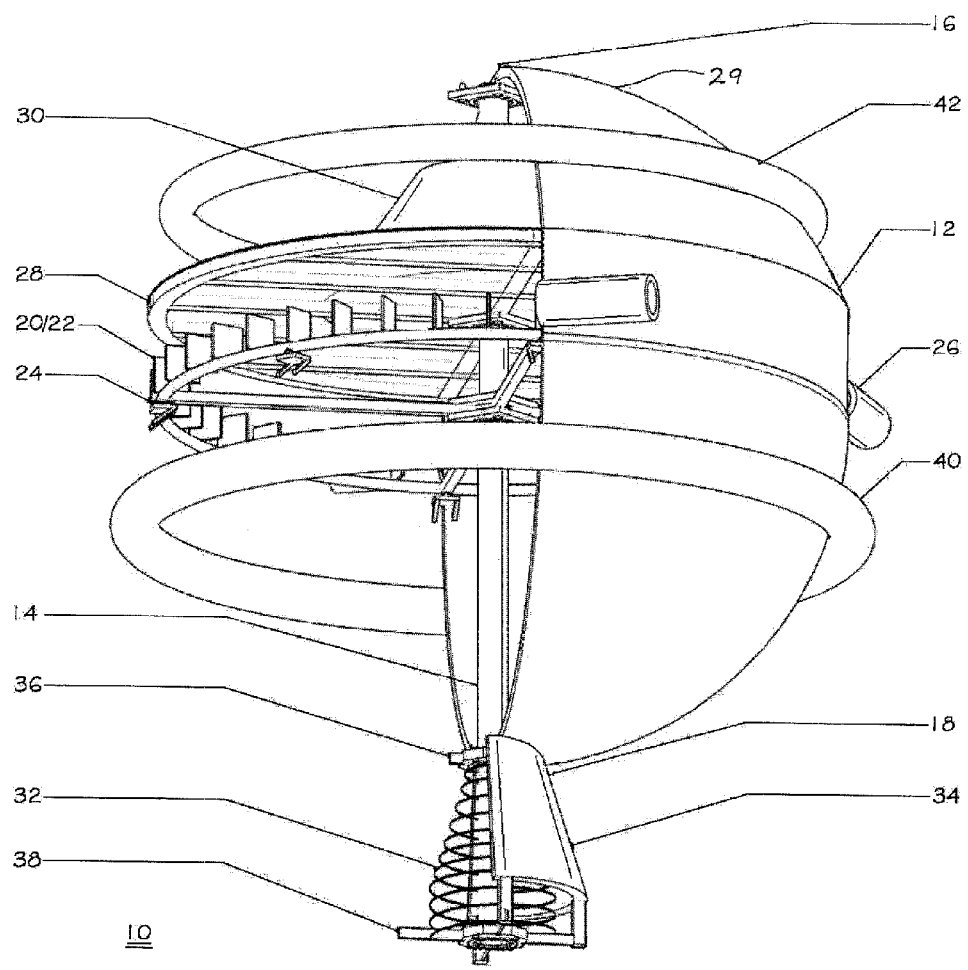
FIG. 6 is a 90-degree rotated view of FIG. 5 showing the positioning of the intake ducts relative to the turbine and blades thereof and also showing the screw auger and water output associated with the south pole of the sphere.

An inflow of ambient deep waters against blades 20 is accomplished through the use of a plurality of inlet ports 26 (see FIGS. 1, 2, and 6). From the views of FIGS. 2 and 6, it is to be noted that the axis of said inlet ports 26 is selected to define a direction of inflow of the ambient deep water against a central portion of each turbine blade 22, thereby maximizing the transfer of energy from the ambient deep water at depth which is directed against the turbine blades, inducing rotation of said blades, as well as their support frame 24 and power axle 14 to which the frame is rigidly connected.

In a preferred embodiment, each inlet port 26 is provided with control valves (not shown) for regulating the volume and rate of admission of ambient water which, thereby, operates to control the rate of rotation of the blades of the turbine 22.

Shown in FIGS. 1, 3, 4 and 5 is a thrust deck 28 which is rigidly secured, internal to said sphere, to said power axle 14 and turbine 22. It is noted that thrust deck 28 is rigidly secured to the interior of sphere 12 at the circumference thereof, indicated at points 29 in FIGS. 1, 5 and 6. As such, the thrust deck is rigidly secured to the interior of the sphere such that the exterior of generator 30 will not rotate as power axle 14 rotates the armatures (or equivalents thereof) of the generator. In all figures, the location of generator 30 between thrust deck 28 and north pole 16 of the sphere may be seen. Thereform and particularly at an outlet positioned at or near north pole 16 is the output of electricity generated by generator 30 that then may be transferred, via cable (see FIG. 7), to a transmission station 39 located upon a barge 41 floating above the surface of the body of water within which the sphere is immersed or, via cable, to a transmission station 43 located at or proximally to a shoreline 45 of the body of water within which the sphere is immersed. See FIG. 8.

Stability of the sphere at a desired depth is assured through the use of at least one ballast ring 40 (see FIGS. 1, 5 and 6) and at least one buoyancy ring 42. In equilibrium, ballast will equal buoyancy. With said rings 40/42, the lowering elevation or stabilization of the sphere at a given depth may be assured. However, to provide enhanced stability to the sphere, an external anchor 44 of substantial mass may be provided to counter torque or reactive forces associated with the inflow of ambient water to inlet ports 26. See FIG. 7. A similar objective may be achieved through the use of a special-purpose base 46 to which the sphere in turn may be secured, upon the seabed 48. See FIG. 8.

Figure 3:
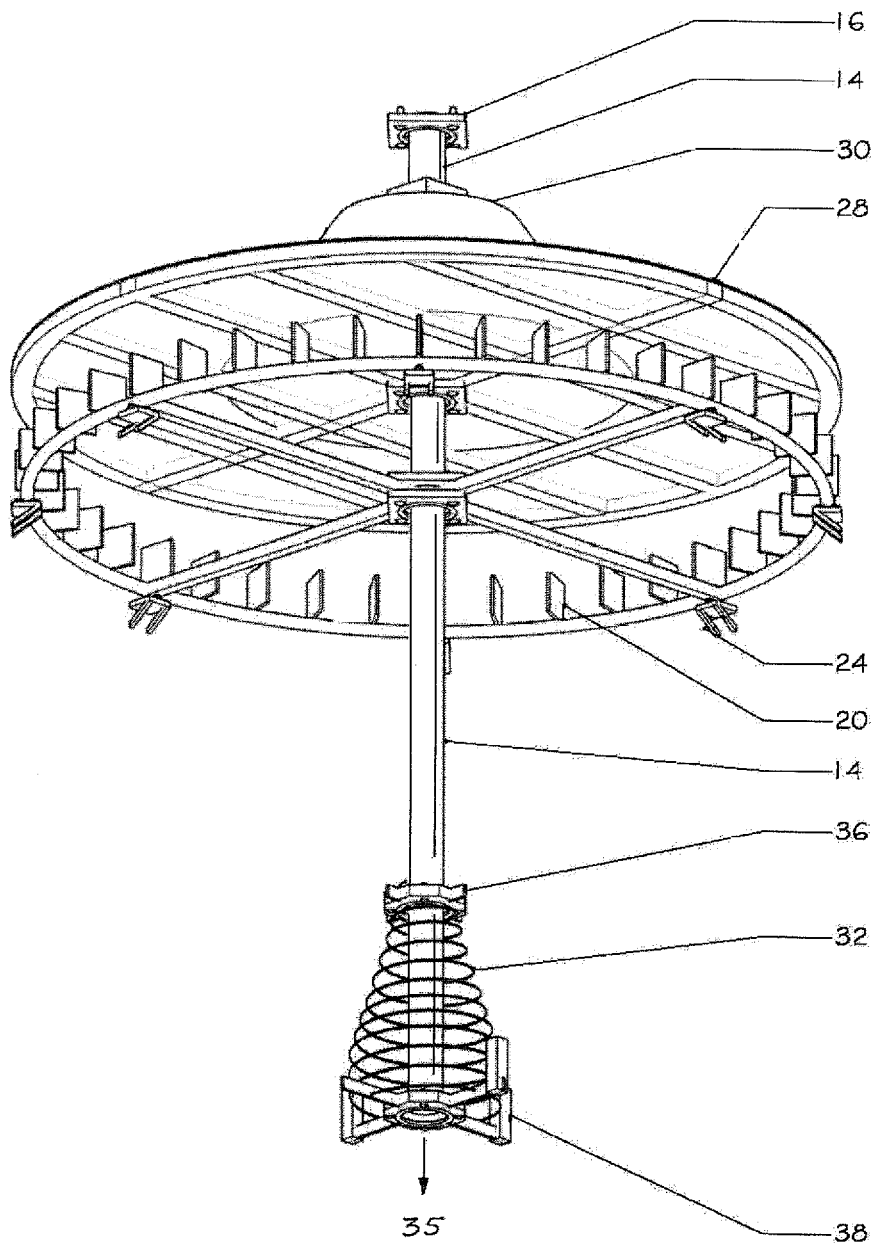
FIG. 3 is a conceptual view showing the elements of the inventive system internal to the sphere thereof.
Figure 4:
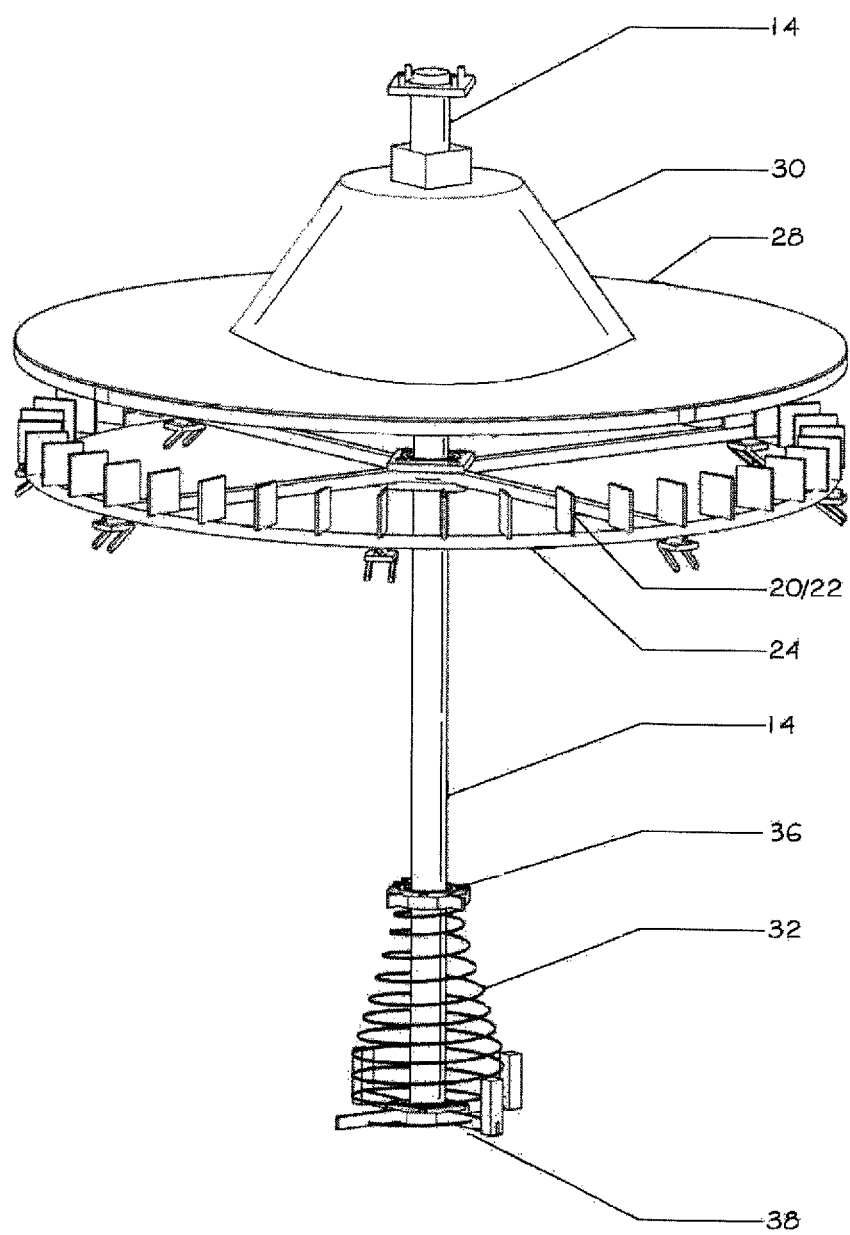
FIG. 4 is a side perspective view of the elements of the invention shown in FIG. 3.

The efficient evacuation of ambient deep water entering the sphere through ports 26 is effectuated through the use of an auger 32 (see FIGS. 1, and 3-6), the rotation of which is effected by the rotation of power axle 14 which rotates at considerable speed by reason of its integral connection with turbine 22. The emission of water internal to the sphere is rendered more efficient through the use of an inverted partial conical segment 34 in the nature of a shroud which maximizes the rate of rotation of the shroud while minimizing cavitation or other unwanted vibration of water as it is expelled downwardly in direction 35. As may be appreciated, the rate of ejection of water from the sphere must be substantially equal to the rate of admission of water to the sphere through the inlet ports 26 to maximize internal stability and operation of the system. Further details of the auger and shroud structure are shown in FIGS. 3 and 4 where propellers 36 and 38 may be seen. As such, the integrated action of auger 32, shroud 34, propeller 36 and propeller 38 will result in an efficient ejection of water from the south pole of the sphere in direction 35.

Figure 5:
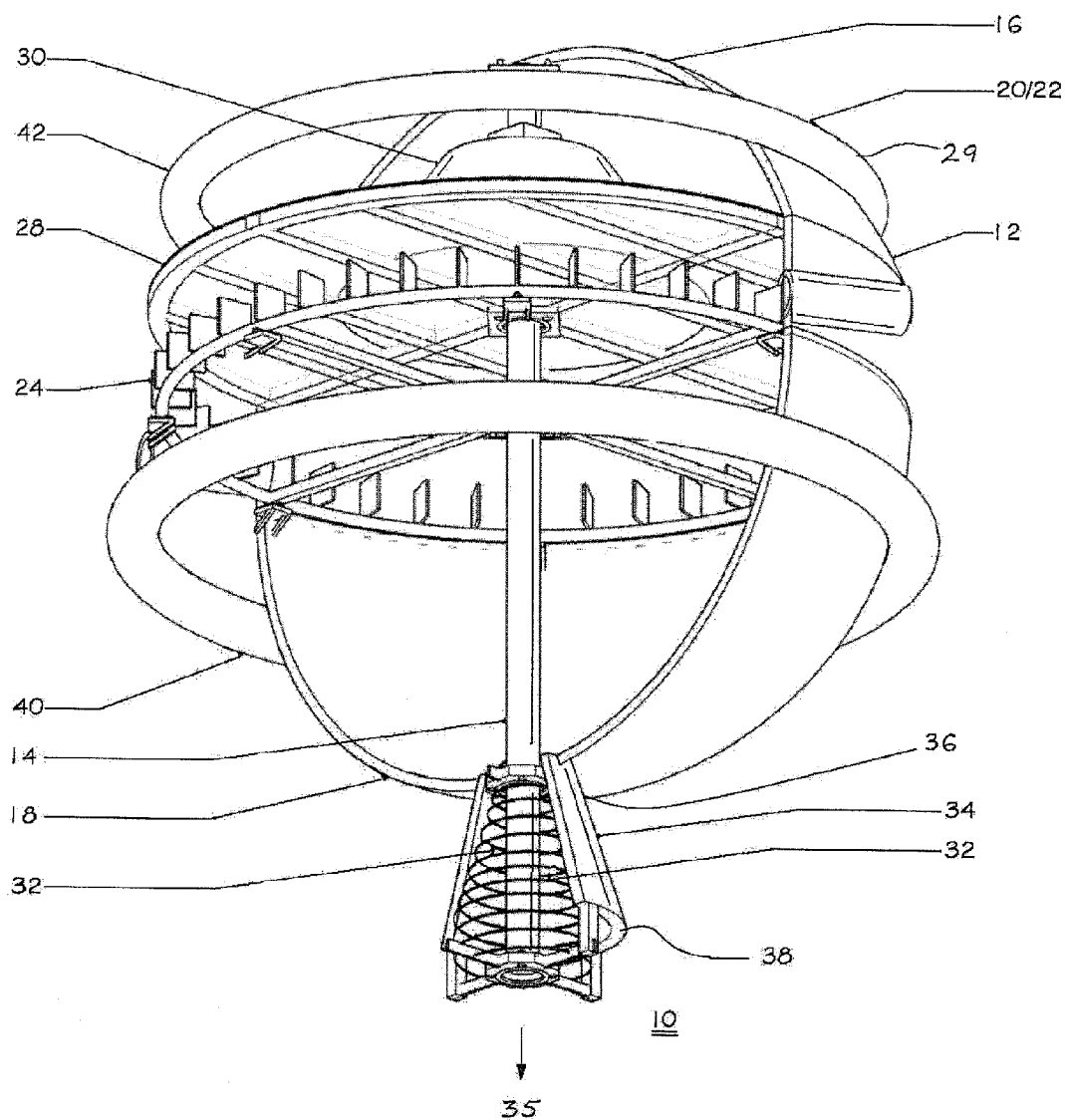
FIG. 5 is an elevated break-away perspective view of the entire system showing the relationship between the turbine and generator located within the sphere as well as the relationship of buoyancy and ballast rings which are secured upon the system sphere.

The above described structure is shroud in perspective breakaway view in FIGS. 5 and 6. Therefrom it may be noted that shroud 34 may possess a hollow cylindrical geometry 37 as opposed to that of the inverted partial cone 34 which is shown in FIG. 1

Figure 7:
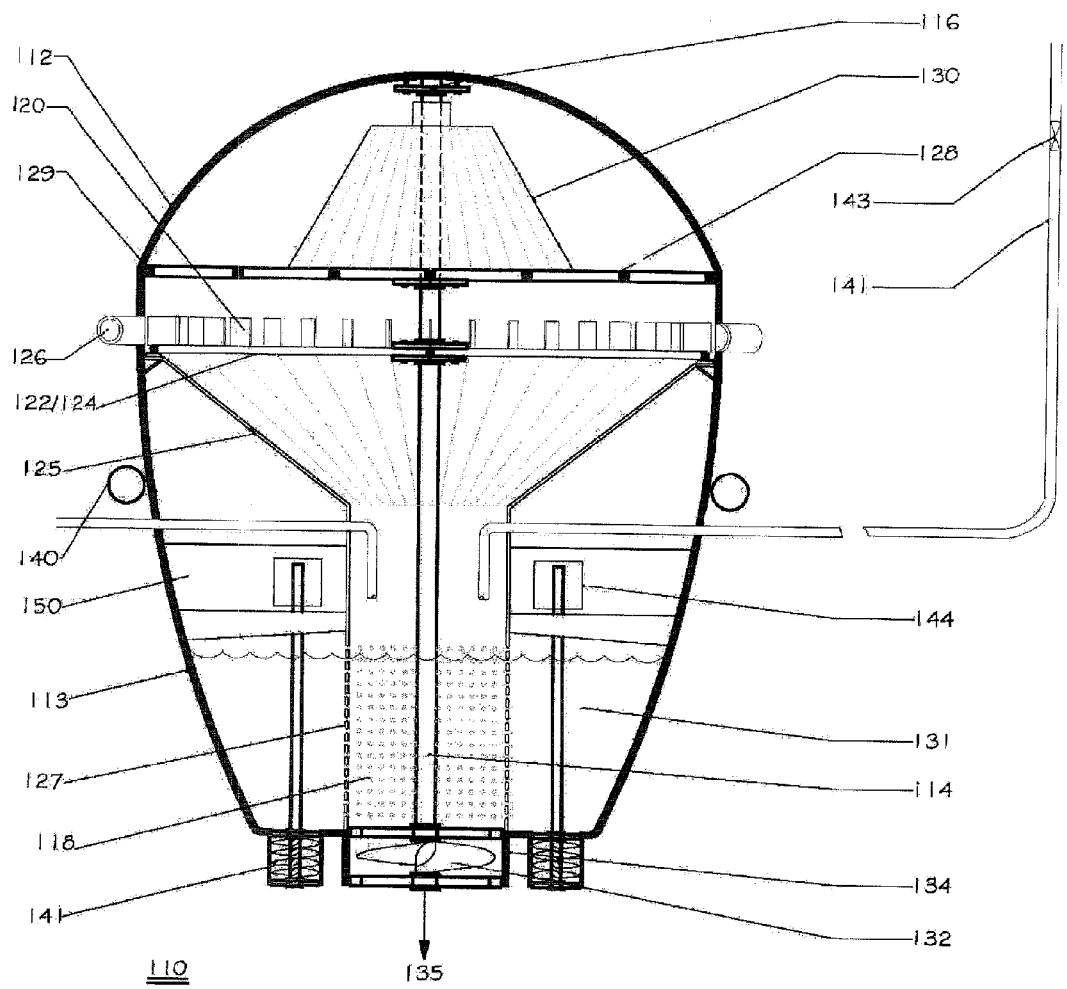
FIG. 7 is a cross-sectional breakaway schematic view of a further embodiment of the present invention.

With reference to FIG. 7, there is shown a further embodiment 100 of the invention. Therein is provided an upper hemispheric fluid-tight enclosure which covers a north pole 116 of the structure. However, the lower half of the sphere 12 in the embodiment of FIGS. 1-6 is replaced by a lower generally ovoid-shaped enclosure 113 in the embodiment of FIG. 7. Further, in embodiment 110 of FIG. 7, the upper portion thereof above turbine blades 120 and inlet conduits 126 is identical to that of embodiment 10 of FIG. 1-6, namely, there is provided a thrust deck 128 and a generator 130 secured thereupon in which both said turbine and generator are rotated by and about a power axle 114 of the system.

In FIG. 7, shown beneath support frame 124 is a funnel-like structure 125 which extends downwardly into a cylindrical region 127 which, as may be noted, is characterized by apertures in its lower region such that the interior of cylinder 127 may communicate with water 131 in the lower part of said enclosure 113.

In addition to inlet conduits 126, the upper part of cylinder 127 is provided with pneumatic inputs 131, the pressure and control of which are regulated by valves 133. See FIG. 7. The provision of pressurized air from the surface through conduits 131 to the upper region of cylinder 127 operates to facilitate efficient evacuation of water 131 through auger 132 at the bottom of power axle 114 to increase the efficiency of discharge 135 of water 131 through the auger. Such discharge is further enhanced through the use of secondary augers 133 which are powered by electric motors 144 and power pack 150. It is to be appreciated that augers 141 many operate supplementally to auger 132 or, alternatively, may operate as a back-up system for discharge of water 131 in the event of a malfunction of the primary auger 132.

Figure 8:
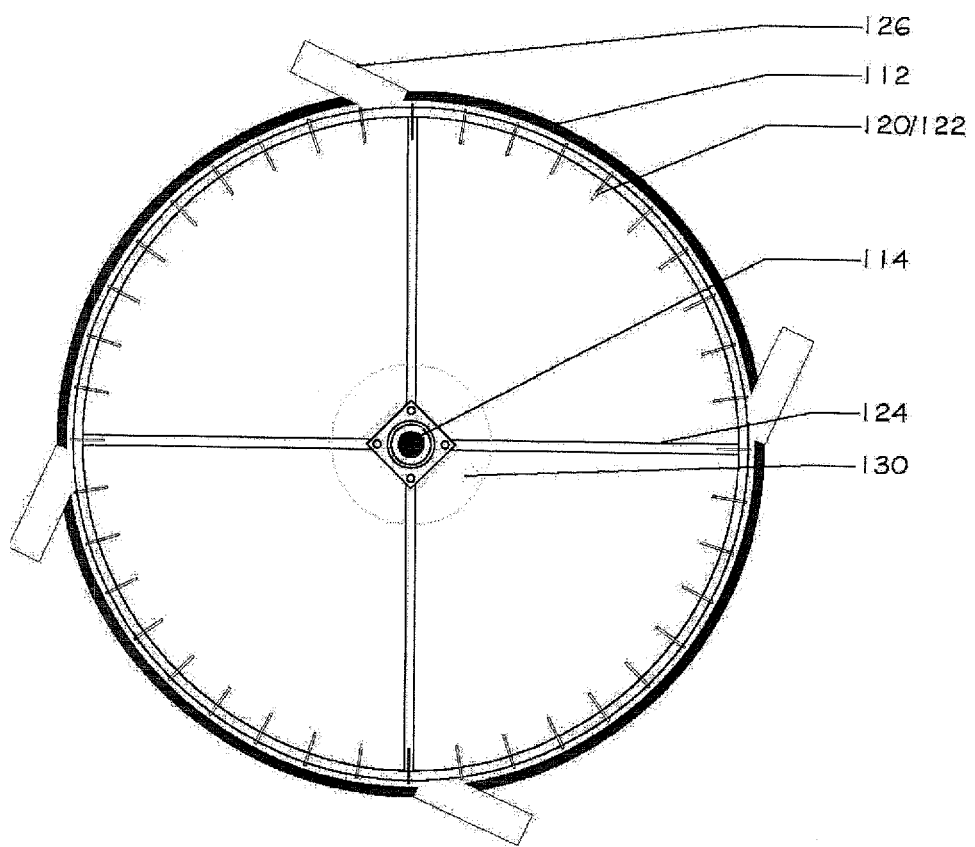
FIG. 8 is a cross-sectional view taken through Line 8-8 of FIG. 7.

FIG. 8 is a radial cross-sectional view taken through Line 8-8 of FIG. 7, showing therein turbine blades 120, turbine 122, support frame 124, power axle 114 and the location of generator 130.

Figure 9:
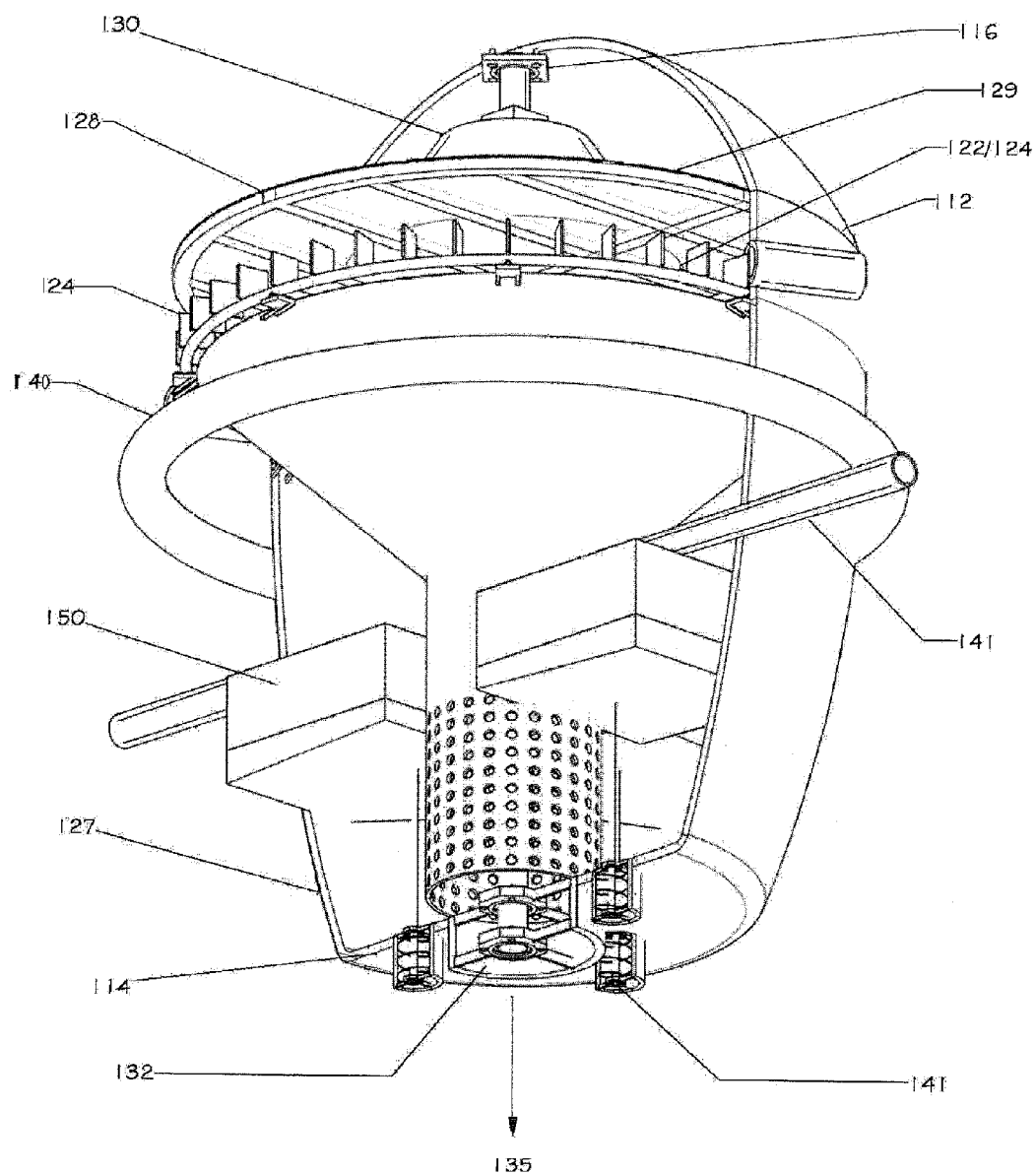
FIG. 9 is a conceptual view of the embodiment of FIG. 7 showing the exterior thereof broken away.

FIG. 9 is an elevated 180 degree break-away perspective view of the entire system of the embodiment of FIG. 7 showing the relationship between the turbine assembly and the auger-based discharge assembly of the system, as well as associated elements. In FIG. 9 may also be seen power packs 150 which operate secondary augers 133 as well as the structure of cylinder 127 and the apertures in the lower portion thereof. In FIG. 9 may also be seen pneumatic input lines 141 as well as ballast ring 140.

Figure 10:
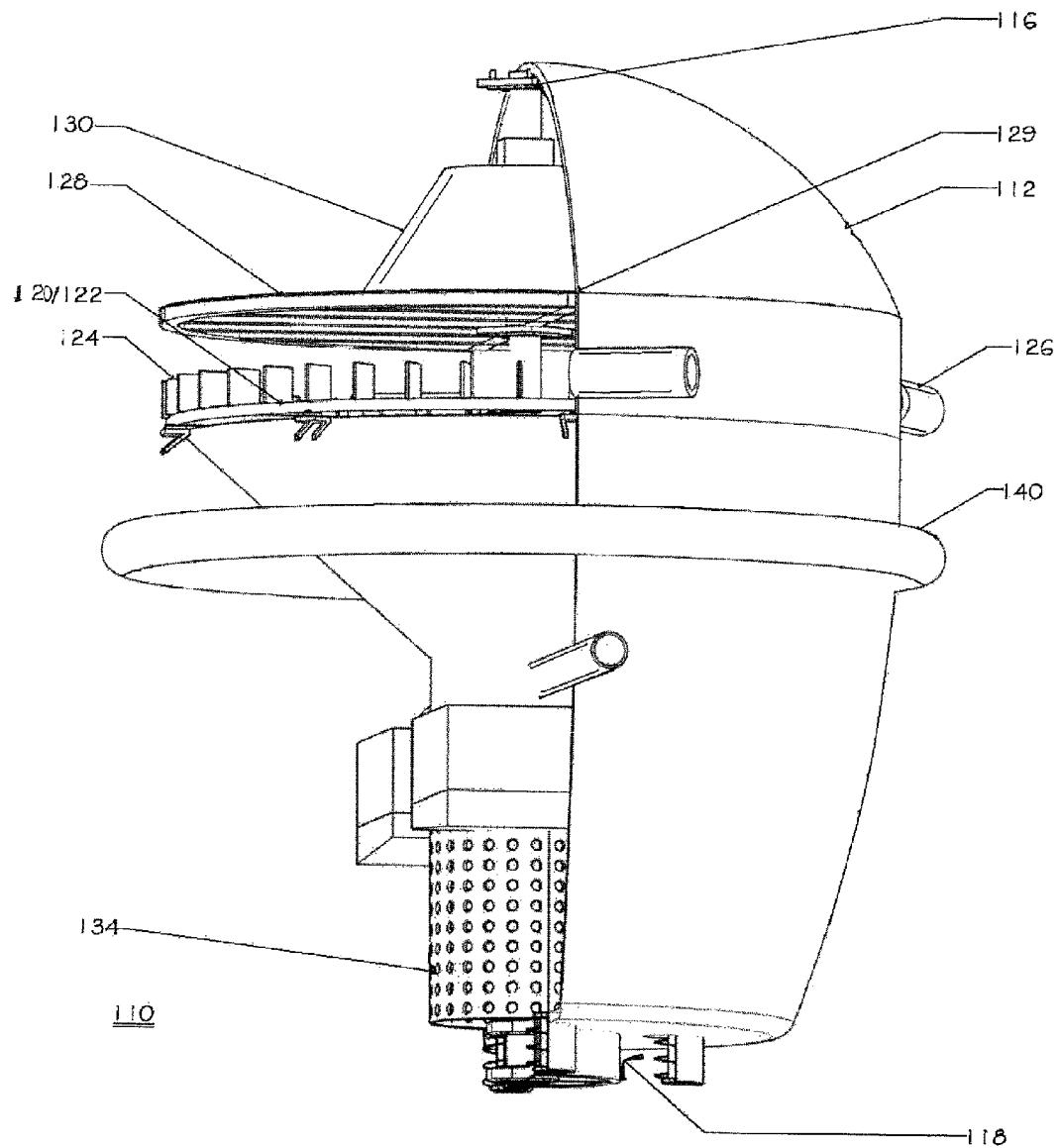
FIG. 10 is a view, similar to that of FIG. 9, however rotated approximately 90 degrees clockwise relative to the view of FIG. 11.

FIG. 10 is a view, similar to that of FIG. 9, however rotated counter-clockwise by 90 degrees. Therein one may mare fully see the dimensional relationship of generator 130 and its support platform 128 relative to turbine 124.

Figure 11:
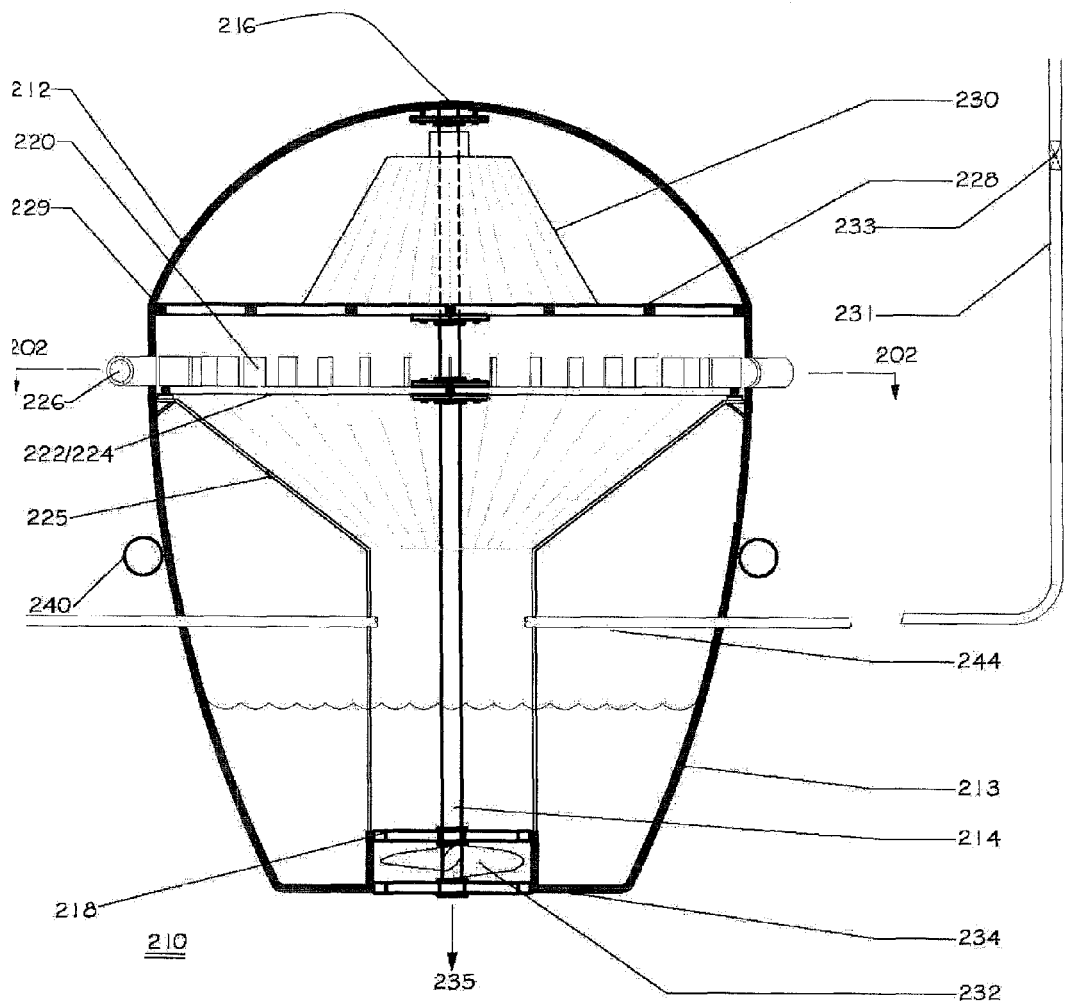
FIG. 11 is a cross-sectional breakaway schematic view of a further embodiment of the present invention.

In FIG. 11 may be seen a further embodiment 210 of the invention, the same being substantially similar to that of the embodiment of FIGS. 7-10 however in which secondary augers 133 and supporting power packs 150 in the embodiment 110 of FIG. 7 have been eliminated. That is, embodiment 210 of FIG. 12, as in the case of embodiment 110 of FIGS. 7-10, includes a power axle 214, upper hemisphere 212, lower voidal portion 213, turbine blades 220 forming form 222 which is secured upon a support frame 224 in which turbine 230 is powered by the rotation of power axle 214. Also shown are water inlets 226, pressurized pneumatic inputs 241 and its compressor and control valves 234.

Figure 12:
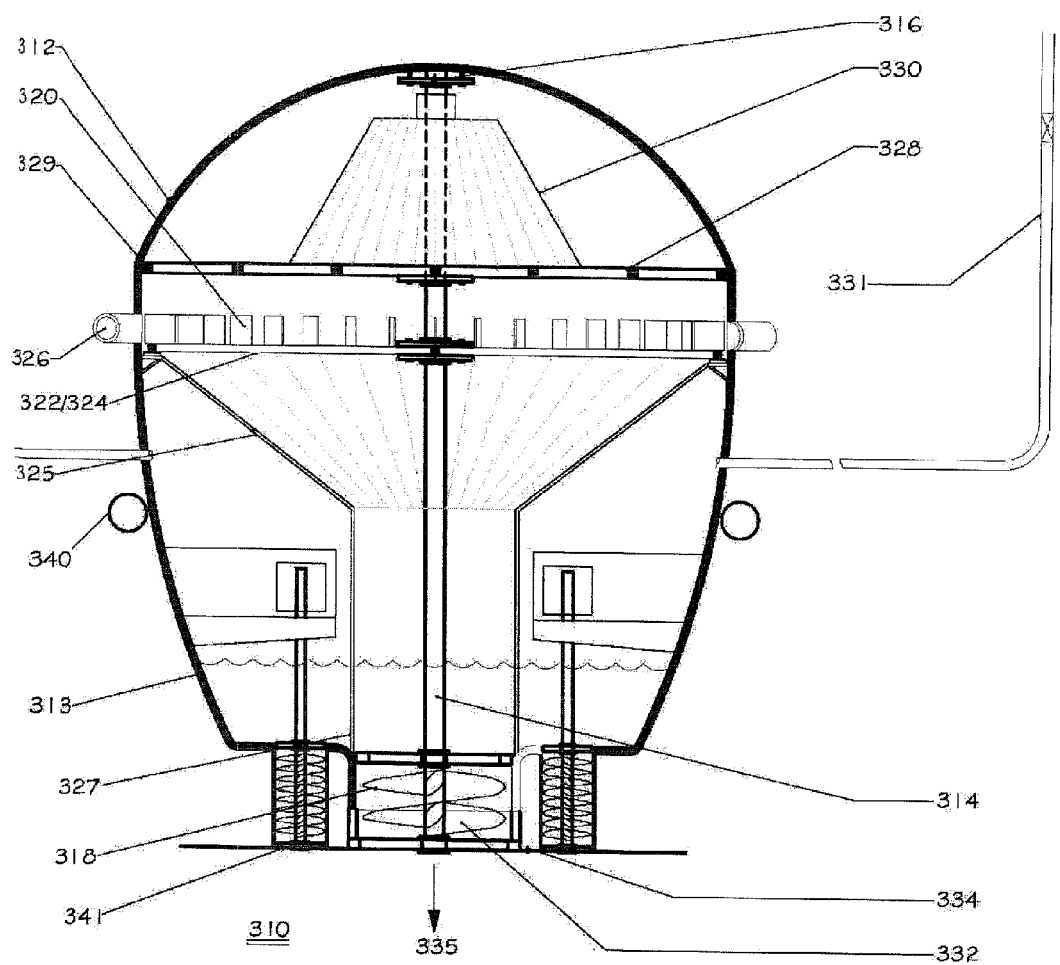
FIG. 12 is a cross-sectional schematic view of a yet further embodiment of the invention.

Shown in FIG. 12 is a further embodiment 310, generally similar to the embodiment 110 of FIGS. 7-10, the primary difference being in that cylinder 327 is not apertured and that pneumatic pressure lines 341 lead indirectly into the interior of oval shaped lower portion 313 of the system as opposed to directly into cylinder 127 as shown in FIG. 7. In other words, in the embodiment 310 of FIG. 12, pneumatic pressure lines 341 pressurize the entire lower portion of the system beneath conical section 321 which communicates upwardly from cylinder 327. As in embodiment 110, there are provided a primary auger 332 and secondary augers 333, as well as power axle 314, turbine 320, inlets 326, and generator 330.

Figure 13:
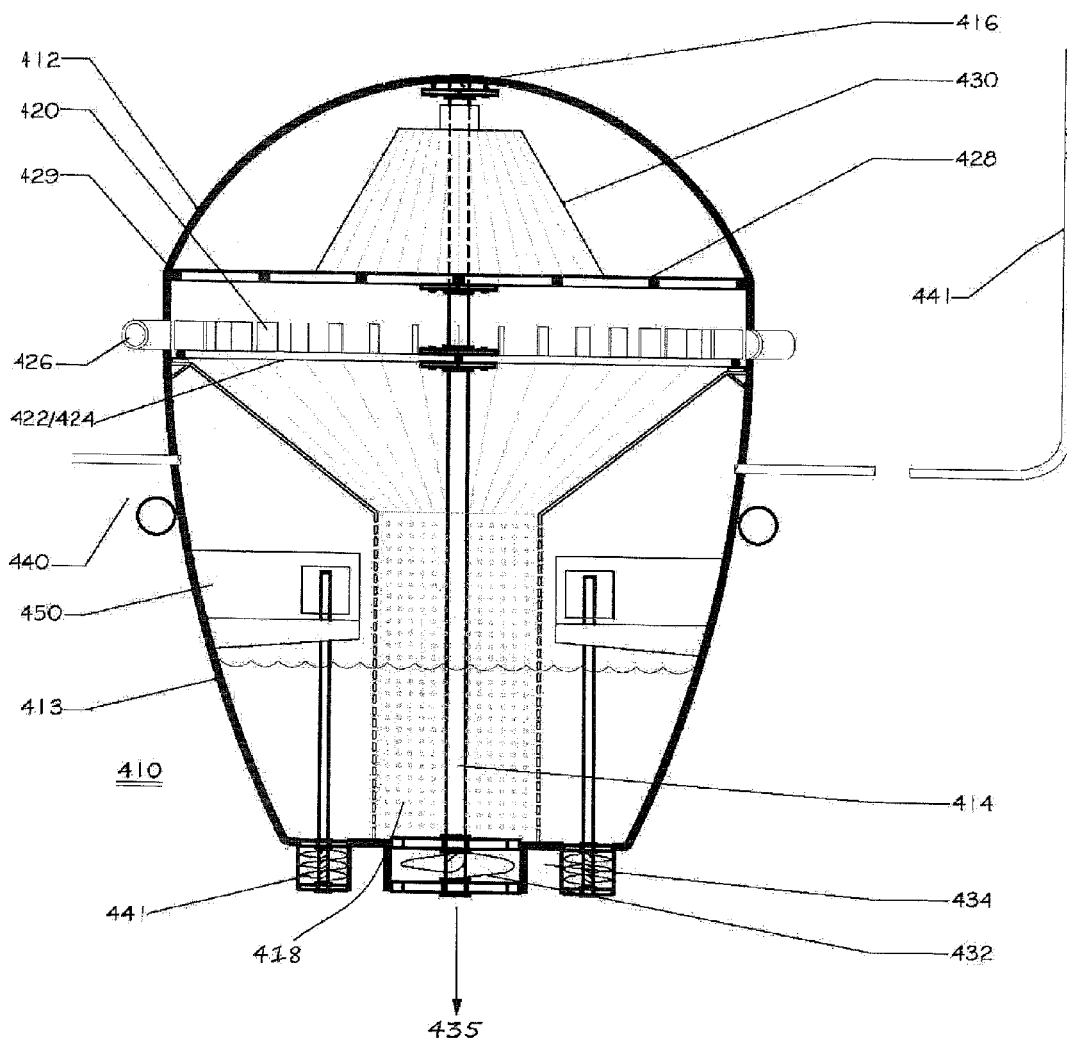
FIG. 13 is a cross-sectional view of a still further embodiment of the invention.

In FIG. 13 is shown a further embodiment 410 of the present invention, the same largely resembling embodiment 110 shown in FIGS. 7-10, however in which pressurized pneumatic lines 441 feed directly into lower oval shaped region 413 of the inventive system as opposed to into upper portion 412 as shown in embodiment 110 in FIG. 7. FIG. 13 also employs a cylindrical screen-like structure 427 that is higher than the level of water 431, but otherwise similar to the structure of FIG. 7.

All embodiments 110, 210, 310, and 410 are provided with ballast rings 140, 240, 340 and 440 respectively, which also operate as stabilizers for the inventive deep water power generation system.

Figure 14:
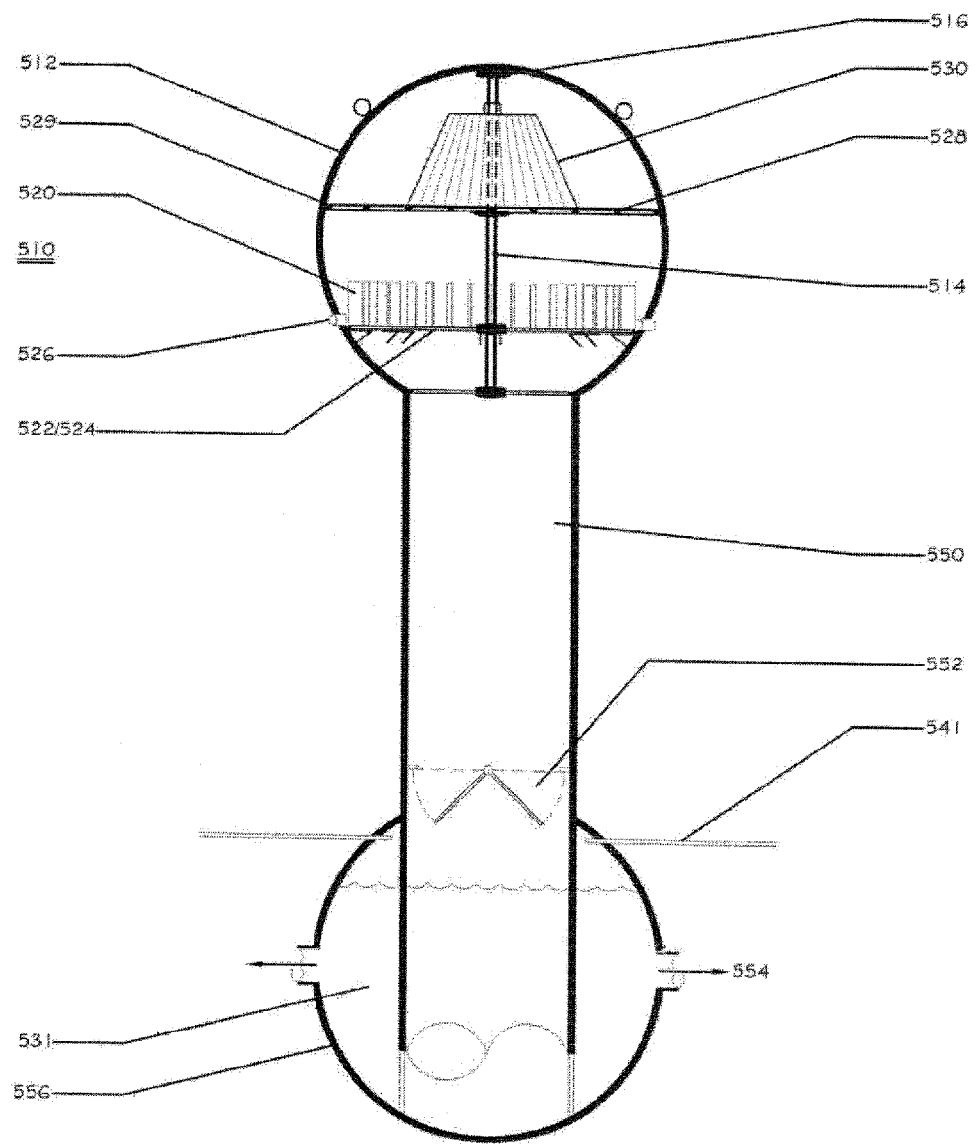
FIG. 14 is a cross-sectional schematic view of a further embodiment of the invention.
Figure 19:
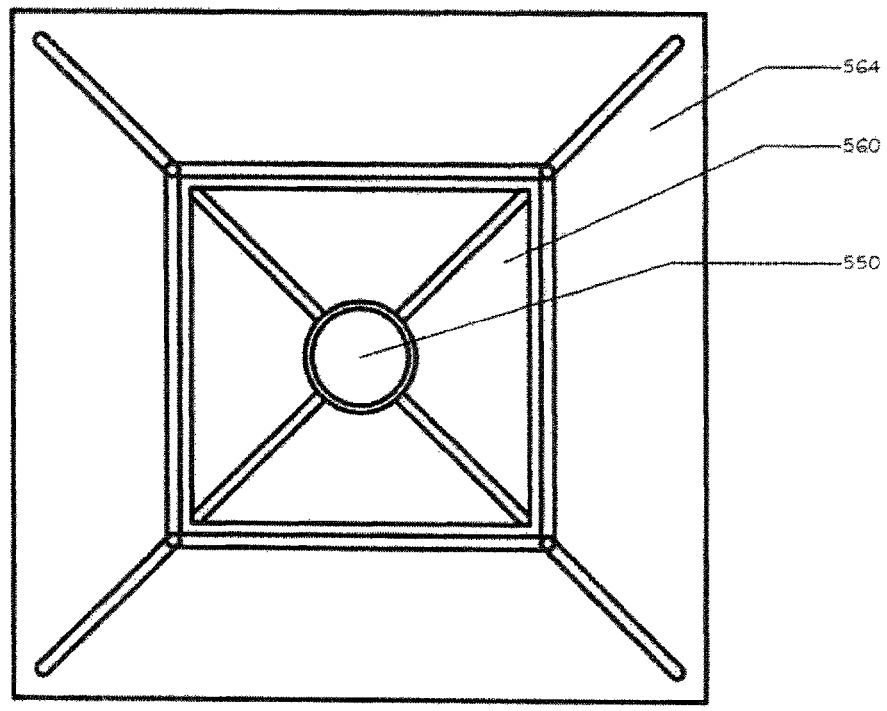
FIG. 19 is a top plan view of the ballast shown in FIG. 18.

With reference to FIG. 19, there is shown a further embodiment 510 of the present invention, the essential difference between it and prior embodiments being the use of a second, lower spherical chamber 556 co-linear with power axle 514 within gravity vector but positioned directly beneath upper spherical chamber 512. As in prior embodiments, upper spherical chamber 512 includes turbine 522 consisting of a multiplicity of turbine blades 527 set upon a turbine deck 520. Water at depth enters through inlets 526 thereby effecting rotation of turbine 522 and, therewith, power axle 514 by which generator 530, secured upon turbine deck 529, is rotated. Therefrom electricity is generated. As may be further noted in FIG. 14, there is provided a central elongate vertical cylindrical region 550 through which water 531 falls after it has impacted and contributed to the rotation of turbine blades 520. Thereby the advantage of a gravity drop between upper chamber 512 and lower chamber 556 is effectuated. At the point of approach to lower chamber 556, there is provided a one-way or butterfly valve 552 which assures that water 531 can only pass into lower chamber 556 but that water therefrom cannot move upwardly into cylindrical region 550. Further shown in FIG. 14 are air lines 541 from which compressed air is provided to assist in the expulsion of water 531 through outlets 553 and associated outlet pumps. This design assures that water which enters the system through inlets 526 is furnished with appropriate velocity and positive air pressure to efficiently exit through outlet ports 554 of the system.

Figure 15:
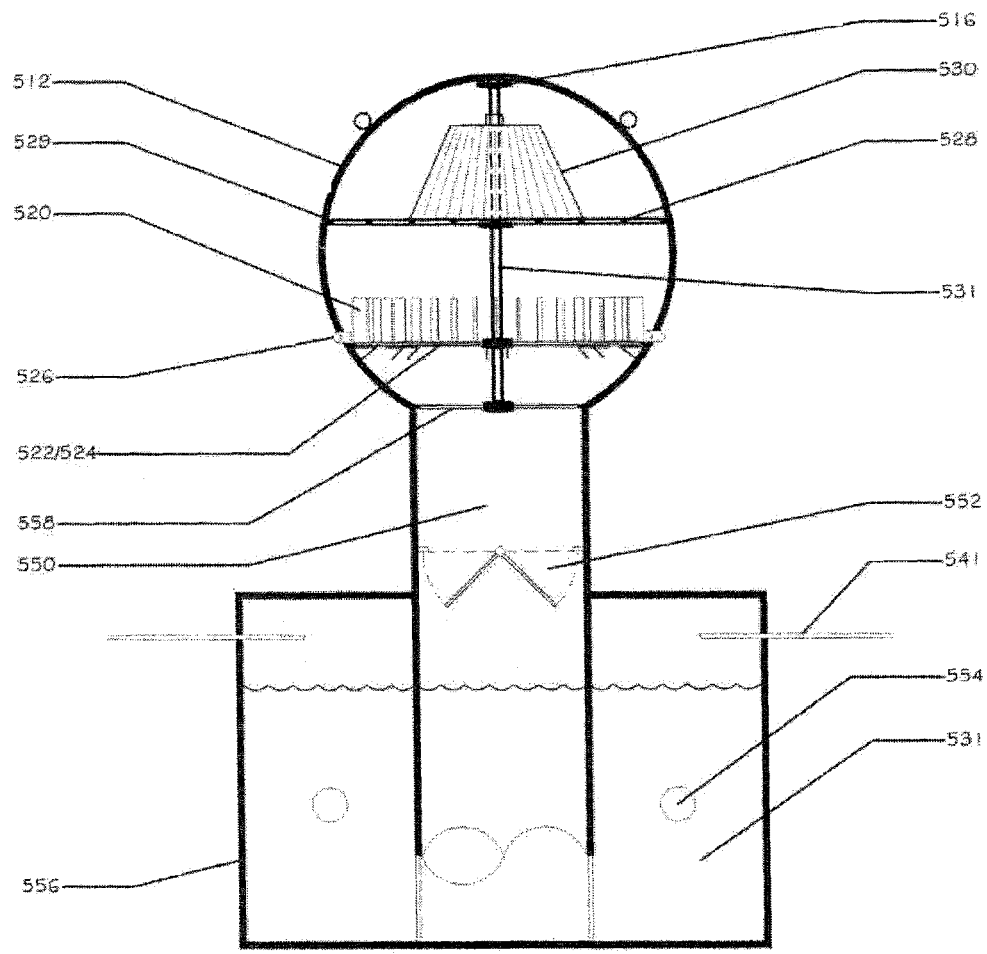
FIGS. 15 and 16 are front and side cross-sectional views of a yet further embodiment of the invention.
Figure 16:
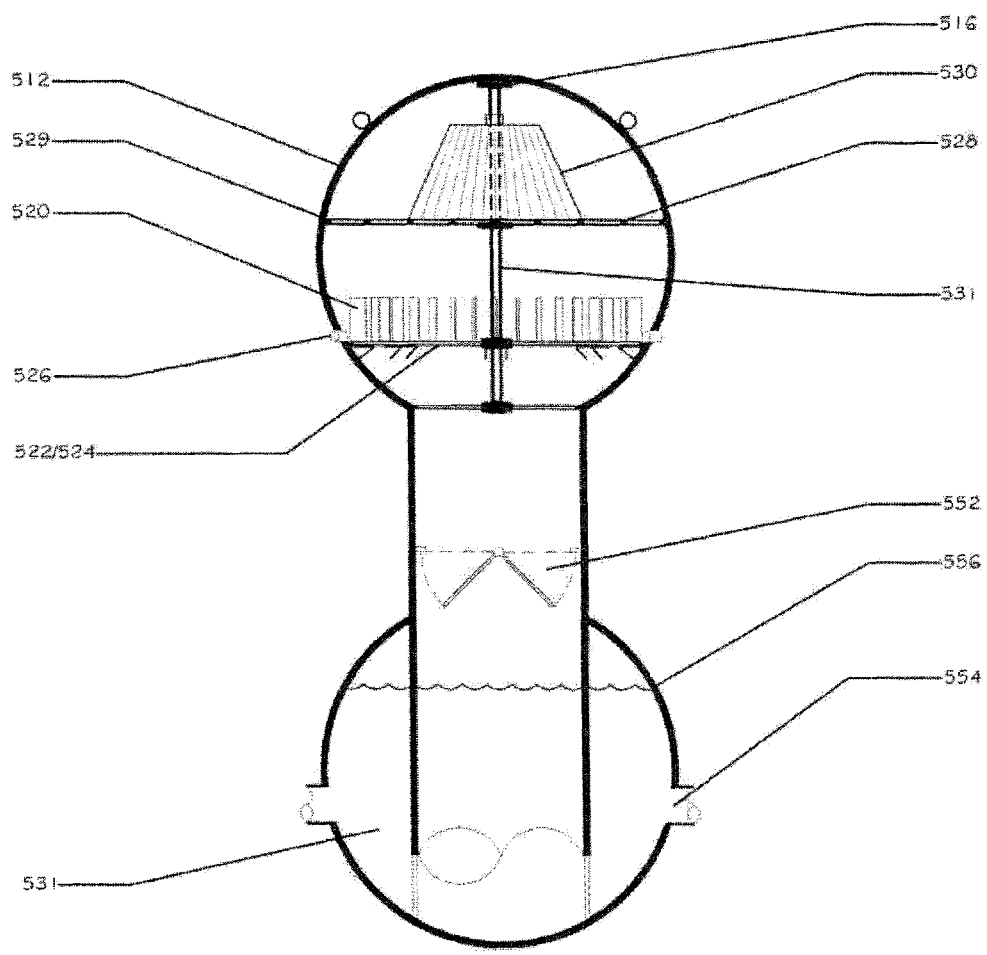
Figure 17:
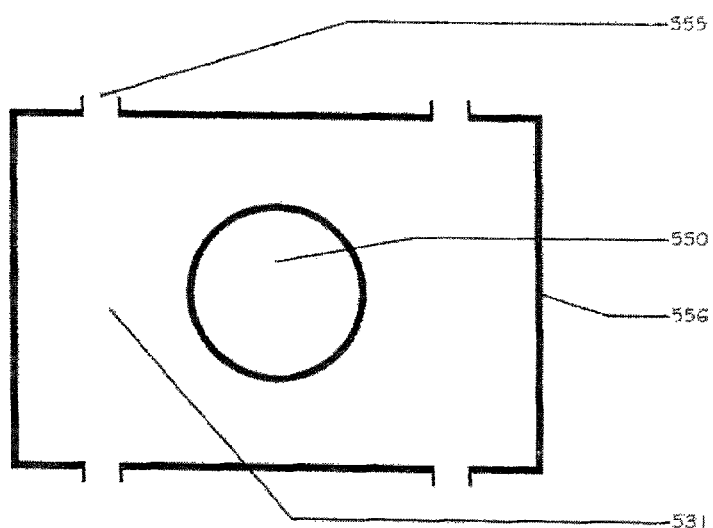
FIG. 17 is a view of a variation of the lower water discharge portion shown in the embodiment of FIGS. 15 and 16.

Shown in FIGS. 15-17 is a further embodiment of the invention in which a cylinder-like water exit chamber 656 is provided in lieu of lower spherical chamber 556 of the embodiment 510 of FIG. 14. FIG. 16 constitutes a side view thereof. Accordingly, taking FIGS. 15 and 16 in combination, one may appreciate that lower chamber 656 is preferably cylindrical in a direction having its axis transverse to the gravity vector. In other respects, the embodiment of FIGS. 15 and 16 are similar to that of FIG. 15, this including elongate vertical drop central cylindrical region 650, inlet 626, pneumatic inputs 641, and water outlets 654 which may include pumping means therefore. A variant of lower chamber 656 is shown in FIG. 17 in which there are provided four pumps assisted outlet conduits 655 for the purposes of assuring efficiency of expulsion of water 631 from the system.

Figure 18:
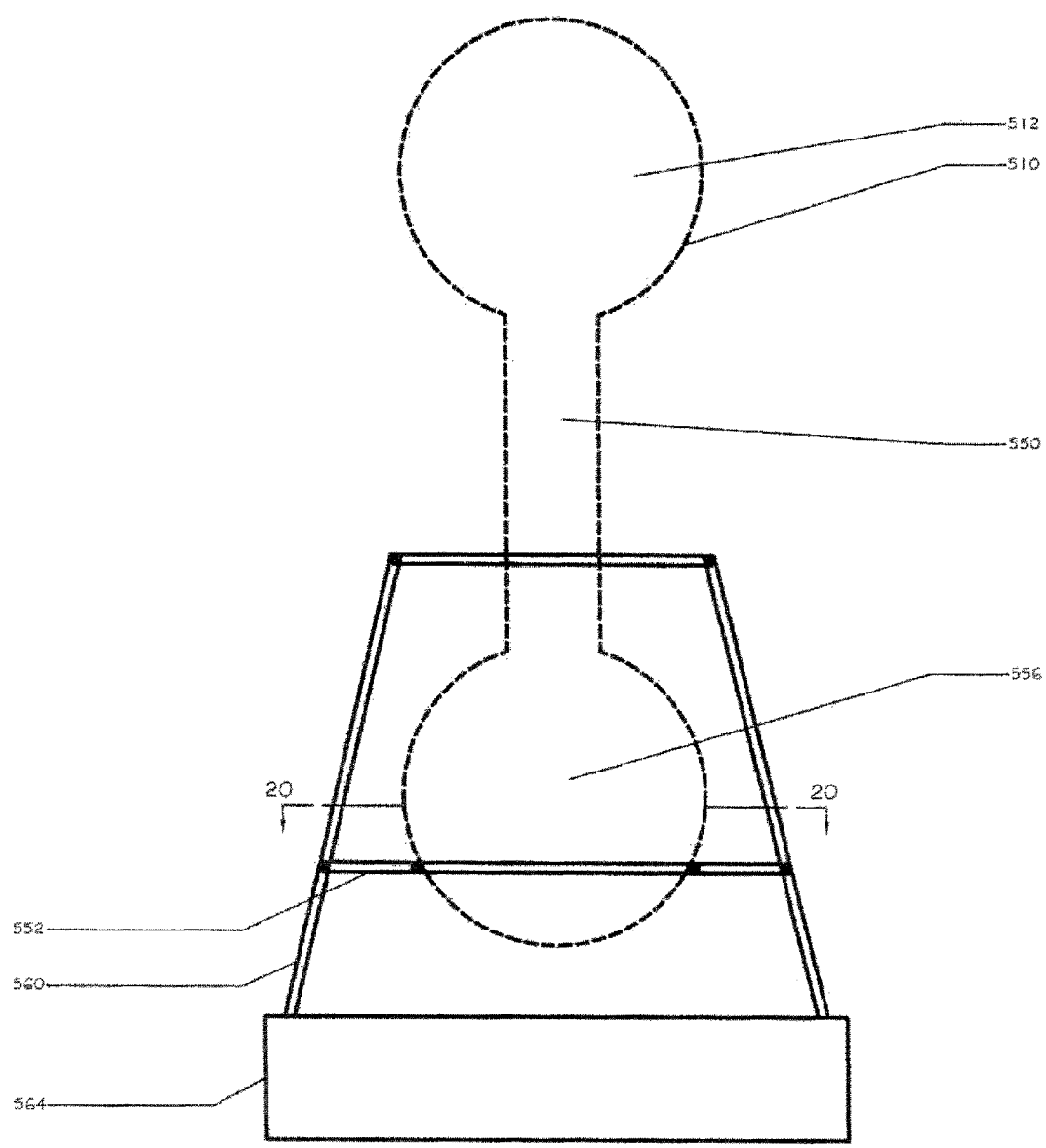
FIG. 18 is a front cross-sectional view of a ballast for use with selective embodiments of the present invention.
Figure 20:
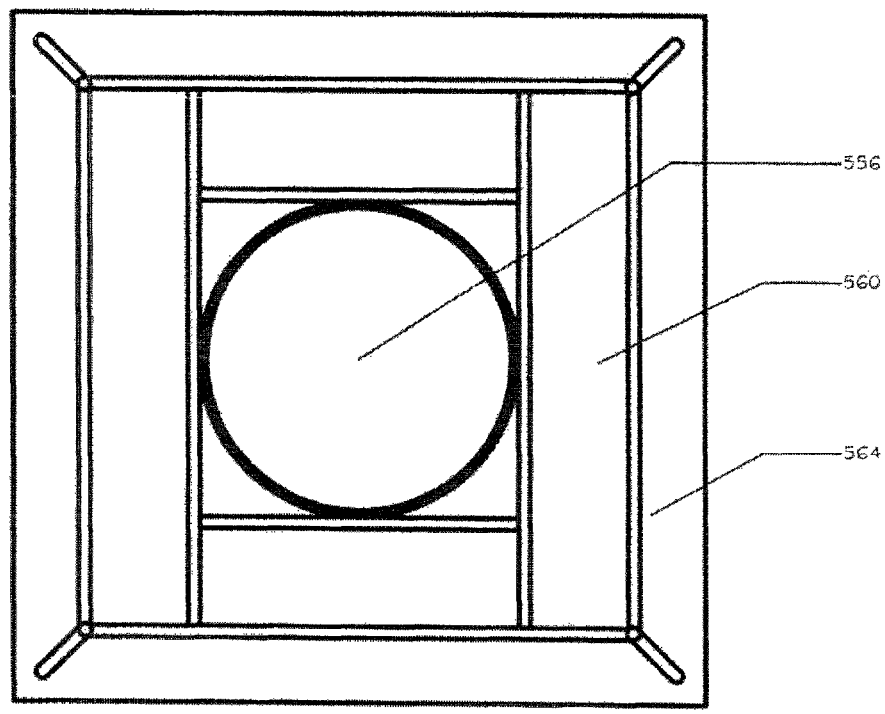
FIG. 20 is a horizontal cross-sectional view taken through Line 20-20 of FIG. 18.

Shown in FIGS. 18-20 is a ballast means which may be used effectively with either embodiment 510 or 610, as described above. In FIG. 18, the embodiment 510 is shown by means of example with a ballast 560 which includes a chamber support surface 562 and a lowermost base 564 which are shown in perspective front cross-sectional view in FIG. 18, top plan view in FIG. 19, and center cross-sectional view in FIG. 20, taken along Line 20-21 of FIG. 18. It is to be understood that ballast 560, inclusive of ballast base 564 are typically formed of many tons of a dense material such as concrete to assure stability of any of the embodiments of the present invention with which it is used within the underwater environment that is contemplated.

While there has been shown and described above the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

The invention claimed is:

1. A deep-water power generation system, comprising:
   (a) an initially evacuated sphere having walls of suitable strength or reinforcement for maintaining the structural integrity thereof in deep-water pressures;
   (b) a power axle extending through said sphere from a north pole thereof to below a south pole of said sphere;
   (c) a multiplicity of blades of a turbine secured upon a support frame secured to said axle in a latitudinal plane of said sphere;
   (d) a plurality of inlet ports within said sphere positioned at said latitudinal plane of said blades of said turbine and defining a direction of inflow of ambient deep-water against said blades, in which energy from said fluid flow induces rotation of said blades, their said support frame and said power axle secured to said frame;
   (e) a thrust deck rigidly secured, within said sphere, to said power axle and above said turbine;
   (f) a generator secured upon said thrust deck, its axis of rotation defined by said power axle extending therethrough; and
   (g) a fluid power output of said sphere defined by an auger secured at a bottom end of said power axle proximally to said south pole of said sphere, said auger spirally expelling water from said south pole as said power axle is caused to rotate by said ambient deep water inflow against said blades of said turbine.

2. The system as recited in claim 1, further comprising a plurality of ballast and buoyancy rings secured externally to and about said sphere, at least one each in a northern and southern hemisphere of said sphere.

3. The system as recited in claim 1, further comprising:
   an anchor securable to said sphere to limit rotation of said sphere during said inflow of ambient deep water.

4. The system as recited in claim 3, further comprising:
   a cable for establishing electrical communication between an electrical output of said generator and a transmission station.

5. The system as recited in claim 1, further comprising:
   a weighted base engagable with a seabed, said sphere secured to said base.

6. The system as recited in claim 5, in which said transmission station is located proximally to a shoreline of a body of water within which said sphere is positioned.

7. A deep-water power generation system, comprising:
   (a) an initially evacuated enclosure having walls of suitable strength or reinforcement for maintaining the structural integrity thereof in deep-water pressures;
   (b) a power axle extending in alignment with a gravity vector through said enclosure from a north pole thereof to a south pole of said enclosure;
   (c) a multiplicity of blades of a turbine secured upon a support frame secured to said axle in a latitudinal plane of said enclosure;
   (d) a plurality of inlet ports within said enclosure positioned at said latitudinal plane of said blades of said turbine and defining a direction of inflow of ambient deep-water against said blades, in which energy from said fluid flow induces rotation of said blades, their said support frame and said power axle secured to said frame;
   (e) a thrust deck rigidly secured, within said enclosure, to said power axle and above said turbine;
   (f) a generator secured upon said thrust deck, its axis of rotation defined by said power axle extending therethrough; and
   (g) a fluid output of said enclosure defined by at least one propeller secured to said south pole of said enclosure, said propeller expelling water from said south pole as said power axle is caused to rotate by said ambient deep water inflow against said blades of said turbine.

8. The system as recited in claim 7, further comprising:
   At least one pneumatic input to said enclosure for increasing ambient air pressure within said enclosure, thereby assisting the expulsion of water through said at least one propeller.

9. The system as recited in claim 8, further comprising at least one ballast a ring secured externally to and about said enclosure.

10. The system as recited in claim 8, further comprising:
    a cable for establishing electrical communication between an electrical output of said generator and a barge positioned at a surface of a body of water above said enclosure.

11. The system as recited in claim 8, further comprising:
    a base engagable with a seabed, said enclosure secured to said base.

12. The system as recited in claim 8, further comprising:
    an anchor securable to said enclosure to limit rotation thereof during said inflow of ambient deep water.

13. The system as recited in claim 8, further comprising:
    control valves within said inlet ports for regulating admission of said ambient deep water and thereby a rate of rotation of said blades of said turbine.

14. The system as recited in claim 8, further comprising:
    a hollow frusto-conical funnel-like structure, a mouth thereof in fluid communication with a periphery of said turbine, and an output thereof in fluid communication with said fluid output of said enclosure.

15. A deep-water power generation system, comprising:
    (a) a first initially evacuated enclosure having walls of suitable strength or reinforcement for maintaining the structural integrity thereof in deep-water pressures;
    (b) a power axle extending in alignment with a gravity vector through said first enclosure from a north pole thereof;
    (c) a multiplicity of blades of a turbine secured upon a support frame secured to said axle in a latitudinal plane of said first enclosure;
    (d) a plurality of inlet ports within said first enclosure positioned at said latitudinal plane of said blades of said turbine and defining a direction of inflow of ambient deep water against said blades, in which energy from said fluid flow induces rotation of said blades, their said support frame and said power axle secured to said frame;
    (e) a thrust deck rigidly secured, within said enclosure, to said power axle and above said turbine;
    (f) a generator secured upon said thrust deck, its axis of rotation defined by said power axle extending therethrough;
    (g) an elongate region having an axis in substantial alignment with the gravity vector, said region integrally dependent from and in fluid communication with a lower area of said first enclosure, said region sufficiently sized to accommodate fluid flow exiting from said turbine blades;
    (h) a second initially evacuated enclosure having an upper region thereof in fluid communication with said elongate region, and having water outlet conduits therefrom; and
    (i) positive pressure air lines in fluid communication with an area of said second enclosure above a flooded area therebeneath from which expulsion of water through said outlets occurs.

16. The system as recited in claim 15 in which said first and second enclosure comprise spheres.

17. The system as recited in claim 15, in which said first enclosure comprises a sphere and said second enclosure comprises a solid cylinder.

18. The system as recited in claim 15 further including a one-way valve fluidly separating said elongate region from said second enclosure.

19. The system as recited in claim 15, further comprising:
   an anchor securable to said lower enclosure to limit rotation and other movement thereof.

20. The system as recited in claim 19, further comprising:
   a cable for establishing electrical communication between an electrical output of said generator and a transmission station.

* * * * *